Dec. 30, 1924.
A. L. BROWNRIGG
ANTIFRICTION BEARING
Filed March 31, 1923
1,520,749
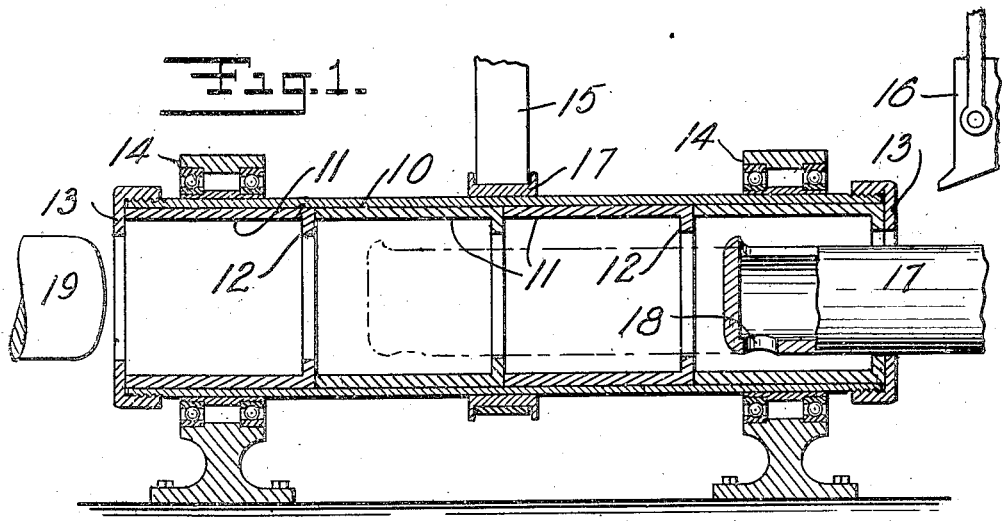
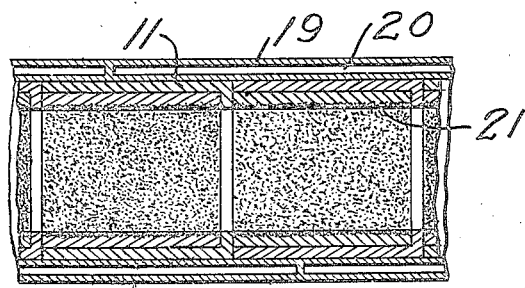
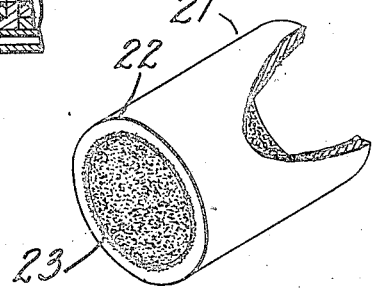
Inventor
Abel L. Brownrigg Patented Dec. 30, 1924.

1,520,749

UNITED STATES PATENT OFFICE.

ABEL L. BROWNRIGG, OF EAST ORANGE, NEW JERSEY.

ANTIFRICTION BEARING.

Application filed March 31, 1923. Serial No. 629,003.

*To all whom it may concern:*

Be it known that I, ABEL L. BROWNRIGG, a citizen of the United States, and resident of East Orange, in the county of Essex and State of New Jersey, have invented certain new and useful Improvements in Antifriction Bearings, of which the following is a specification.

This invention relates to means and a method for the manufacture of bearings and to an improved bearing produced thereby.

Bearings of the general type in which graphite is employed as a lubricating medium are ordinarily formed in either one of two ways. In the method which has gone into the more extensive use a metal composition such as bronze is cast in the form of bushings or other bearing elements provided on their inner surfaces with grooves or indentations which are filled with a graphite composition that is hardened by baking. The other method consists in thoroughly mixing graphite in the molten metal and in cooling the metal quickly to produce a uniform distribution of the graphite flakes or particles throughout the mass of metal. Bearings made in accordance with the first method referred to are relatively expensive because of the cost of producing and filling the grooves while the other form lacks structural strength because of the weakening effect of the graphite distributed therethrough and also has a relatively low lubricating capacity because of the proportionately small concentration of graphite at the inner bearing surface.

Bearing bushings of the cast bronze, brass or other cast metal types as heretofore manufactured are open to the general objection that in order to provide the requisite mechanical strength and resisting qualities, it was thought necessary to form the bushings with relatively thick walls. This structural formation resulted in a product having relatively great weight and bulk, factors which tend to restrict the useful applications of the bearings in practice.

The general objects of the present invention are to provide a composition bearing in which the ingredients of the composition are distributed and disposed in the body of the bearing in accordance with the functions which they are to perform, and also to provide a cast type of bearing having relatively great toughness and strength and correspondingly thin walls.

The invention includes the concentration of graphite or other lubricating ingredient in the bearing composition at the bearing surface, and the use of centrifugal casting means and a centrifugal casting process for utilizing centrifugal force to concentrate the lubricating element of the composition at the bearing surface during the casting operation in which the bearing is formed.

The centrifugal action utilized in the forming operation has the effect of producing bearing members having a relatively great density and strength in their outer portions and with a correspondingly increased concentration of the relatively light-weight graphite or other lubricating element at the inner surface where the lubricating function is utilized.

Another feature of the invention resides in the capability of producing bearing bushings or shells with relatively thin walls as contrasted with the relatively thick walls of the cast bushings heretofore known and used. The thin walled bushings thus produced possess a higher factor of strength than that of the prior thick-walled cast bearings because of the dense, non-porous and homogeneous character of the metal, produced under the pressure conditions of the centrifugal casting operation. The thin walled castings may or may not include graphite or other special lubricating ingredient and may consist of any desired bearing metal or composition of metals.

The metal used for the body of the bushing or shell may consist of a bronze or a brass composition as in the prior art or of a lighter-weight material having a relatively higher heat conductivity, such as aluminum, with a suitable proportion of copper or other metal to give the compound the necessary toughness and strength.

In the drawings,

Figure 1 is a view partly in cross-section and partly diagrammatic of centrifugal casting device embodying a part of the invention.

Figure 2 is a sectional view of a portion of the device shown in Figure 1 at the conclusion of a casting operation.

Figure 3 is a view partly in perspective and partly broken away of a bearing bushing embodying the invention.

Referring to the drawings for a more detailed description of the invention, in Figure 1 is shown an apparatus particularly adapted for use in casting bearing bushings of the graphite or compound metal types. At 10 is shown a tubular casing into which can be placed a series of permanent molds 11 which may be formed of cast iron or other suitable material and used over and over again. The molds 11 preferably have an inwardly directed flange 12 at one end which serve to form separating members between adjacent castings and also to determine the thickness of the wall of the casting produced.

When the molds have been placed in position in the casing 10 the clamping rings 13 are placed in position on the ends of the casings through a screw-threaded or other suitable connection and the casing is rotated in the bearings 14 at a relatively high speed of rotation, the rotation of the casing in its bearings 14 being effected through a belt 15 and pulley 16 connection or in any other suitable manner.

When the casing and the contained molds 11 have reached a suitable rotative speed, a measured volume of molten metal into which a quantity of graphite in flake or other form has been thoroughly stirred, is poured as from a container 16' into the open upper side of a hollow charging device 17 which can be pushed into an open end of the rotating mold device to thereby distribute molten metal along the inner surfaces of the molds 11 through a port 18 in the lower forward end of the charging member 17. The charging device 17 may also be used without the discharge port 18 by rotating the device about its axis to deposit the contents in the molds after the charging device has been pushed into the rotating casing. The molten metal quickly distributes itself along the length and about the interior of the molds in the form of an annular mass whose wall is equal in thickness to the depth of the flanges 12 on the mold members. The continued whirling or rotating operation, through the action of centrifugal force, causes the relatively heavy metal to take a position along the outer portion of the annular mass and to correspondingly displace the lighter graphite and force it inwardly to the inner or bearing surface where the lubricating effect of the graphite can be best utilized.

The rotation is continued during the period required to permit the molten metal to become hardened or set sufficiently to permit removal of the molds from the casing and the separation of the castings from the molds. Before the metal has reached a completely hardened condition, a core tool 19 may be pushed into the molding device along the axis thereof to smooth and form the inner surfaces of the newly cast bearings to the desired gauge as well as to distribute the graphite in a substantially continuous layer to obtain the maximum lubricating effect. In some cases the metal charging member 17 may be used as a core forming member as will be clear.

When the bushings have reached a suitable degree of hardness the rotation of the casing 10 is stopped and one of the clamping rings 13 is removed to permit removal of the molds 11 from the casing, the newly cast bushings being readily removable from the enclosing mold members because of the slight shrinkage which they undergo in cooling. Bushings 21 formed in the manner described will be found to be characterized by a hard and resistant outer shell 22 or framework having an inner bearing surface 23 formed largely of graphite but with metal interspersed therein to reinforce and hold the graphite in place for the most effective application thereof as a lubricating material.

If desired the casing 10 may be supplied with a jacket 19, as in Figure 2, to provide a temperature controlling chamber 20 through which, for instance, water may be passed to chill the outer surfaces of the castings being formed and thereby harden and strengthen the body or framework of the bushings.

While reference has been made to the use of bearing compositions containing graphite, it will be clear that compositions containing other lubricating ingredients such as the lubricating metals may also be employed, advantage being taken of the different specific gravities of the different ingredients of the composition to bring about the concentration of the lubricating element at either the inner or outer surface of the casting being produced.

It will be seen also that by means of the centrifugal casting process bearing bushings or shells of relatively great thinness can be produced because of the dense and homogeneous character of the casting formed under the pressure due to centrifugal action, and that this feature of the invention may be taken advantage of either with or without the concentration of a lubricating ingredient of the composition at a bearing surface. In casting relatively thin walled bushings a core member may be used with advantage as a forming tool although its use is not confined solely to thin-walled castings.

It will also be seen that when graphite is employed as the lubricating element of the bearing composition, it is in a pure condition unmixed with a binder or other substance that of necessity would detract from the lubricating quality of the graphite. In order to obtain the full lubricating effect of the graphite at the bearing surface a light cutting operation may be availed of to remove any undesirable metal coating from adjacent graphite particles and expose a pure graphite lubricating surface for contact with the shaft. Because of the use of permanent metal molds a minimun of cutting or grinding is required to produce a finished bearing thereby eliminating a number of operations necessary when the casting operations are carried out by the use of sand molds.

What I claim is:—

1. As a new article of manufacture, a bearing formed of intermixed metal and graphite, the graphite being concentrated mainly at the wear surface.

2. As a new article of manufacture, a composition bearing bushing formed of intermixed metal and graphite, the proportion of graphite in the composition being greater at the inner than at the outer surface of the bushing.

3. As a new article of manufacture, a composition bearing bushing formed of intermixed metal and graphite, the graphite ingredient being progressively increased from the outer to the inner surface of the bushing.

4. As a new article of manufacture a centrifugally cast composition bearing containing graphite deposited at the inner surface thereof as the result of the centrifugal action.

5. As a new article of manufacture a bearing bushing having a progressively increasing density from its inner to the outer peripheral portions thereof.

6. That method of forming an antifriction bearing which consists in intermixing graphite with molten metal and in subjecting the mixture to a centrifugal casting operation.

7. That method of forming a bearing bushing which consists in intermixing graphite with molten bronze, in charging a mold with the mixture, and in rotating the mold at high speed about the axis of the bushing to be produced.

8. That method of forming a bearing bushing which consists in intermixing with molten metal a lubricating material having a specific gravity different from that of the metal, in charging a mold with the mixture, and in rotating the mold at high speed about the axis of the bushing to be produced.

ABEL L. BROWNRIGG.